US012709558B2

(12) United States Patent
Al-Otaibi et al.

(10) Patent No.: US 12,709,558 B2
(45) Date of Patent: Aug. 18, 2026

(54) DEWATERING APPARATUS, SYSTEMS, AND METHODS

(71) Applicant: Saudi Arabian Oil Company, Dhahran (SA)

(72) Inventors: Saud I. Al-Otaibi, Riyadh (SA); Mohamud M. Farah, Ras Tanura (SA)

(73) Assignee: Saudi Arabian Oil Company, Dhahran (SA)

(*) Notice: Subject to any disclaimer, the term of this patent is extended or adjusted under 35 U.S.C. 154(b) by 637 days.

(21) Appl. No.: 18/310,792

(22) Filed: May 2, 2023

(65) Prior Publication Data

US 2024/0368004 A1 Nov. 7, 2024

(51) Int. Cl.

*C02F 1/44* (2023.01)
*C02F 1/00* (2023.01)
*C02F 103/06* (2006.01)

(52) U.S. Cl.

CPC ............. *C02F 1/441* (2013.01); *C02F 1/008* (2013.01); *C02F 2103/06* (2013.01); *C02F 2209/42* (2013.01)

(58) Field of Classification Search

None

See application file for complete search history.

(56) References Cited

U.S. PATENT DOCUMENTS

| | | | | |
|---|---|---|---|---|
| 2007/0199902 A1* | 8/2007 | Mueller | C02F 9/20 | 210/776 |
| 2009/0194272 A1* | 8/2009 | Baillie | E21B 37/06 | 210/321.6 |
| 2023/0085777 A1* | 3/2023 | Holman | E21B 36/001 | 175/66 |

FOREIGN PATENT DOCUMENTS

| | | |
|---|---|---|
| CN | 101705691 | 7/2011 |
| CN | 202450536 | 9/2012 |
| CN | 111794257 | 10/2020 |
| WO | WO 2022147999 | 7/2022 |

* cited by examiner

*Primary Examiner* — Richard C Gurtowski

(74) *Attorney, Agent, or Firm* — Fish & Richardson P.C.

(57) ABSTRACT

Techniques for dewatering a subterranean formation adjacent a sulfur recovery unit include providing a submersible pump positioned in a subterranean formation adjacent a sulfur tank installed at least partially in the subterranean formation below a terranean surface and configured to store sulfur extracted, in a sulfur recovery unit, from a sour gas produced from a hydrocarbon fluid; sensing, with a liquid level sensor, a level of a liquid in the subterranean formation adjacent the sulfur tank; determining that the sensed level of the liquid exceeds a threshold level; and based on the determination, operating the a submersible pump to circulate at least a portion of the liquid from the subterranean formation, into a conduit fluidly coupled to the a submersible pump, and to the terranean surface through the a conduit.

20 Claims, 4 Drawing Sheets

DEWATERING APPARATUS, SYSTEMS, AND METHODS

TECHNICAL FIELD

This disclosure relates to apparatus, systems, and methods for dewatering and, more particularly, dewatering a subterranean volume adjacent a Sulfur Recovery Unit.

BACKGROUND

Natural gas production often includes the production of sour gas, which is abundant with high levels of Hydrogen Sulfide ($H_2S$). A Sulfur Recovery Unit (SRU) is a central processing unit that further converts this unwanted by-product stream of $H_2S$ into a useful end product by converts the $H_2S$ into elemental sulfur through both Claus and Catalytic Claus Reactions. The produced sulfur is further used to produce other beneficial industrial products such as fertilizers and sulfuric acids. An SRU can include one or more sulfur pits located below ground level, which are used to temporarily store the Sulfur product before transportation or shipping.

SUMMARY

In an example implementation, a sulfur recovery unit dewatering system includes a sulfur recovery unit configured to extract sulfur from a sour gas produced from a hydrocarbon fluid; at least one sulfur tank installed at least partially in a subterranean formation below a terranean surface and configured to store the extracted sulfur; at least one submersible pump positioned in the subterranean formation and in fluid communication with a liquid in the subterranean formation adjacent the at least one sulfur tank; at least one conduit fluidly coupled to the at least one submersible pump and extending to the terranean surface; and at least one liquid level sensor positioned to measure a level of the liquid in the subterranean formation adjacent the at least one sulfur tank. The at least one liquid level sensor is configured, when the measured level exceeds a threshold level, to signal the at least one submersible pump to circulate at least a portion of the liquid from the subterranean formation, into the at least one conduit, and toward the terranean surface.

In an aspect combinable with the example implementation, the liquid includes freshwater or brine.

Another aspect combinable with any of the previous aspects further includes a liquid filtration unit fluidly coupled to the at least one conduit and configured to receive the circulated portion of the liquid from the subterranean formation.

In another aspect combinable with any of the previous aspects, the liquid filtration unit includes a reverse osmosis filtration unit.

In another aspect combinable with any of the previous aspects, the threshold level is a low tide level.

Another aspect combinable with any of the previous aspects further includes a controller communicably coupled to the at least one submersible pump and the at least one liquid level sensor.

In another aspect combinable with any of the previous aspects, the controller is configured to perform operations including identifying the measured level at the at least one liquid level sensor; and activating the at least one submersible pump based on the measured level exceeding the threshold level.

In another aspect combinable with any of the previous aspects, the at least one submersible pump is positioned in a borehole formed from the terranean surface to the subterranean formation.

In another example implementation, a method for dewatering a subterranean formation adjacent a sulfur recovery unit includes providing at least one submersible pump positioned in a subterranean formation adjacent at least one sulfur tank installed at least partially in the subterranean formation below a terranean surface and configured to store sulfur extracted, in a sulfur recovery unit, from a sour gas produced from a hydrocarbon fluid; sensing, with at least one liquid level sensor, a level of a liquid in the subterranean formation adjacent the at least one sulfur tank; determining that the sensed level of the liquid exceeds a threshold level; and based on the determination, operating the at least one submersible pump to circulate at least a portion of the liquid from the subterranean formation, into at least one conduit fluidly coupled to the at least one submersible pump, and to the terranean surface through the at least one conduit.

In an aspect combinable with the example implementation, the liquid includes freshwater or brine.

Another aspect combinable with any of the previous aspects further includes circulating the portion of the liquid to a liquid filtration unit fluidly coupled to the at least one conduit.

In another aspect combinable with any of the previous aspects, the liquid filtration unit includes a reverse osmosis filtration unit.

Another aspect combinable with any of the previous aspects further includes cleaning the portion of the liquid in the liquid filtration unit.

In another aspect combinable with any of the previous aspects, the threshold level is a low tide level.

Another aspect combinable with any of the previous aspects further includes sensing, with at least one liquid level sensor, another level of the liquid in the subterranean formation adjacent the at least one sulfur tank; determining that the another sensed level of the liquid is less than the threshold level; and based on the determination, stopping operation of the at least one submersible pump.

In another example implementation, a dewatering system includes a subterranean pump positionable adjacent a sulfur pit and in a subterranean formation that includes water; at least one conduit fluidly coupled to the subterranean pump and configured to extend from the pump to a terranean surface; a water level sensor positionable to measure a level of the water in the subterranean formation adjacent the sulfur pit; and a control system communicably coupled to the subterranean pump and the water level sensor. The control system is configured to perform operations including identifying a water level sensed by the water level sensor, determining that the water level exceeds a threshold level, and based on the determination, activating the subterranean pump to remove water from the subterranean formation into the at least one conduit.

In an aspect combinable with the example implementation, the water is brine.

In another aspect combinable with any of the previous aspects, the at least one conduit is configured to fluidly coupled to a water filter assembly on the terranean surface.

In another aspect combinable with any of the previous aspects, the water filter assembly is a reverse osmosis filter assembly.

In another aspect combinable with any of the previous aspects, the threshold level is at a predetermined depth below the terranean surface.

In another aspect combinable with any of the previous aspects, the control system is configured to perform operations including periodically identifying the water level sensed by the water level sensor, and when the water level does not exceed the threshold level, deactivating the subterranean pump.

Implementations of dewatering apparatus, systems, and methods according to the present disclosure may include one or more of the following features. For example, implementations according to the present disclosure provide a permanent, intelligent solution to perform dewatering adjacent an SRU. As another example, implementations according to the present disclosure provide an automated system that continuously ensures the protection and asset integrity of SRU underground pits. As another example, implementations according to the present disclosure can provide a way to protect equipment such as sulfur product pumps, rotating equipment, steam coils, and associated piping from corrosion damages. Further, implementations according to the present disclosure provide an innovative and sustainable extension by recovery and reuse of the water obtained through dewatering. Also, implementations according to the present disclosure provide for improved environment sustainability and water conservation and aligns with the governmental sustainability goals. Further, implementations according to the present disclosure can prevent off-specification sulfur product that results from impurities, such as corrosion products, $H_2S$, and sulfuric acid.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

The present disclosure describes example implementations of a dewatering system positioned and operable adjacent to one or more Sulfur Recovery Units (SRUs) and more specifically, adjacent one or more sulfur pits, to protect a structural integrity of such pits and associated equipment and piping associated with the SRU, such as sulfur pumps, steam coils, and other equipment. The example dewatering system includes, for example, one or more water level sensors, one or more dewatering pumps, and piping for water (or other liquid) disposal. In some aspects, the dewatering system can be automated.

Example implementations of a dewatering system according to the present disclosure can function by utilizing an appropriately configured ground-water level monitoring sensor that provides a pre-configured safe groundwater level (such as in a control system or controller). The signal can be connected to a submersible or subterranean pump that (for example, automatically) controls a groundwater level adjacent the sulfur pit to the desired safe target. As a result, the pit integrity is protected due to the mitigation of groundwater ingress into the pit or associated sulfur equipment. Example implementations can also include a water recovery unit that includes a water filtration unit, such as a reverse osmosis (RO) membrane unit that would yield water of enough purity to be reused for diverse usage. This usage can include irrigation, industrial water, firefighting water, etc. Furthermore, the reuse of the water through a desalination unit such as the RO membrane can provide a unique extension to incorporate sustainability into the dewatering process.

Figure 1:
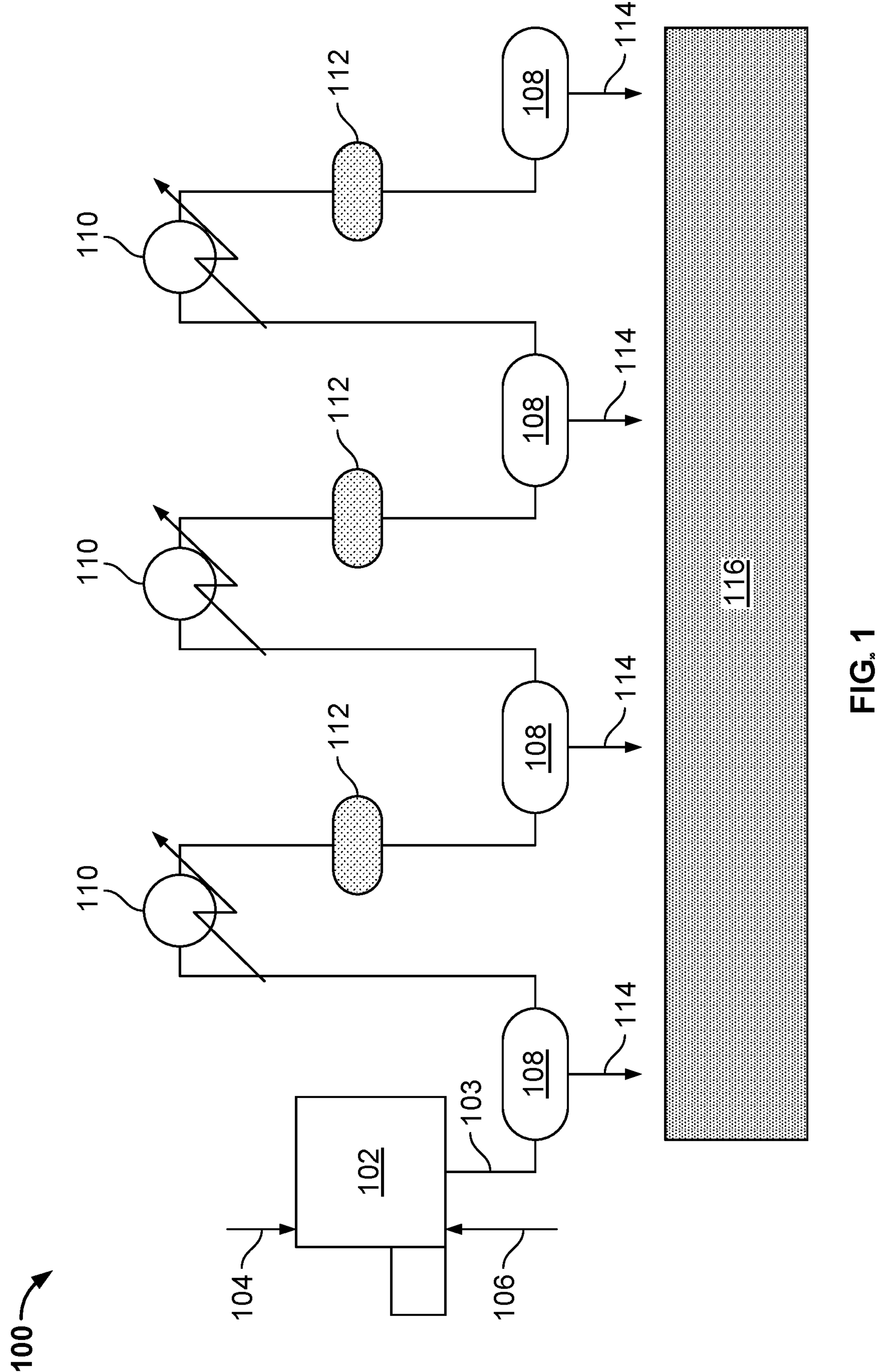
FIG. 1 is a schematic diagram of a Sulfur Recovery Unit that includes a sulfur pit or sulfur storage tank according to the present disclosure.

FIG. 1 is a schematic diagram of a Sulfur Recovery Unit (SRU) 100 that includes a sulfur pit (or sulfur storage tank) 116 according to the present disclosure. As shown, the example implementation of the SRU 100 includes a reaction furnace 102 that receives an airflow 104 and a flor of sour gas 106 (such as $H_2S$ 106). An output byproduct of sulfur gas 103 is circulated through a series of condenser 108, reheaters 110, and converters 112 within a Claus and/or Catalytic Claus Reaction process in the SRU 100 to produce elemental sulfur 114 that is fed to one or more sulfur pits 116. Generally, sulfur pit 116 is constructed with at least a portion thereof underground (beneath a terranean surface) and are used to store (for example, temporarily) the sulfur 114 before transportation and/or shipping. The sulfur 114 has typically stringent specifications, such as $H_2S$ content (for example, max 10 ppm) and purity.

The sulfur pit 116 can typically reach and/or exceed underground depth of 6 meters and are constructed from concrete with flexible expansion joints to allow for thermal expansion and contraction of the pit 116 due to the high molten temperature of the sulfur 114. The sulfur pit 115 can also be equipped with production and integrity critical equipment, such as sulfur pumps for molten sulfur transfer and steam coils to maintain the desired sulfur temperature of 270-280 F.

Figure 2:
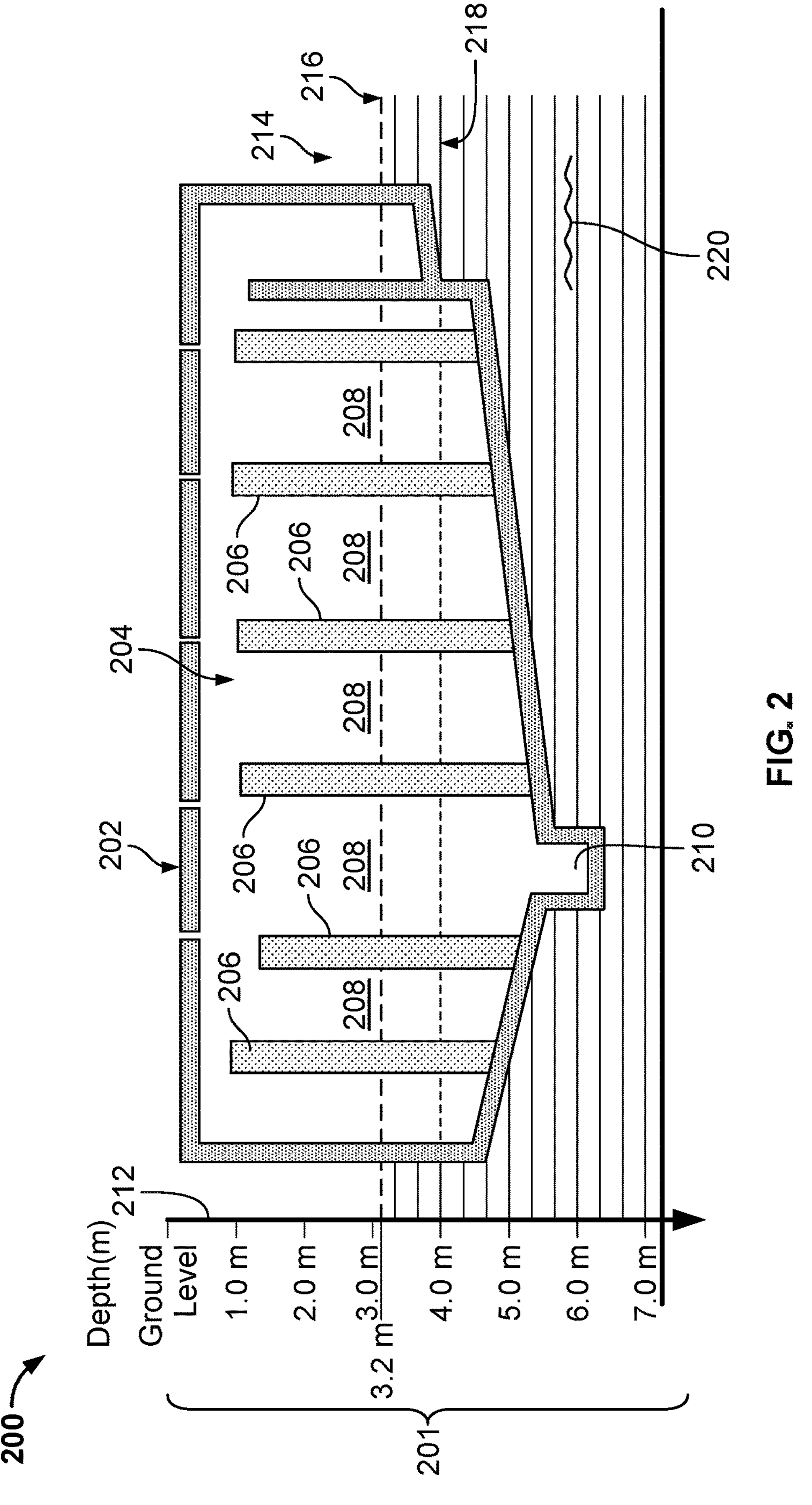
FIG. 2 is a schematic diagram of a sulfur pit or sulfur storage tank built at least partially below ground level and within a source of mobile water according to the present disclosure.

FIG. 2 is a schematic diagram of a sulfur pit 200 (or sulfur storage tank 200) built at least partially below ground level and within a source of mobile water according to the present disclosure. Sulfur pit 200 can also be implemented as the sulfur pit 116 in FIG. 1. As shown in FIG. 2, sulfur pit 200 is constructed such that a top surface 202 (into which the sulfur product 114 is fed) is at or near ground level 212, but extends downward into a subterranean formation 214 through a depth 201 that can reach, for example, 6 meters or more below ground level 212 (in other words, a terranean surface). The sulfur pit 200 illustrated here includes an internal volume 204 that is partitioned into compartments 208 by barriers 206. At a deepest point in the pit 200 is a sump 210.

In some areas of the world, subterranean formation 214 can include or store (at least transiently) mobile or stagnant water 220. The water 220 can be freshwater, brine, a mix thereof, or some form of water mixed with another liquid or gas (such as a hydrocarbon liquid or gas). In some aspects, a level of the water 220 within the subterranean formation 214 (in other words, a shallowest level closest to the terranean surface 212) can vary. As shown in FIG. 2, the water 220 can vary, for example, from a water table level 216, which represents a level at a highest tide of a nearby body of water to a water table level 218, which represents a level at a lowest tide of the nearby body of water.

For example, areas of the Middle East that produce natural gas (and therefore also H2S which is converted into the sulfur 114 in the SRU 100), have an abundance of groundwater. One example are the Sabkhah areas, which generally are areas of extensive, barren, salt-encrusted, and periodically flooded, coastal or inland mudflats or sandflats. As a result, the groundwater is highly saline, typically in the region of 100,000 ppm. The groundwater (in other words, water 220) is saturated with sodium chloride alongside other salts, and as result are very corrosive to both metals and concrete structures of the sulfur pit 200 (and other equipment).

Figure 3:
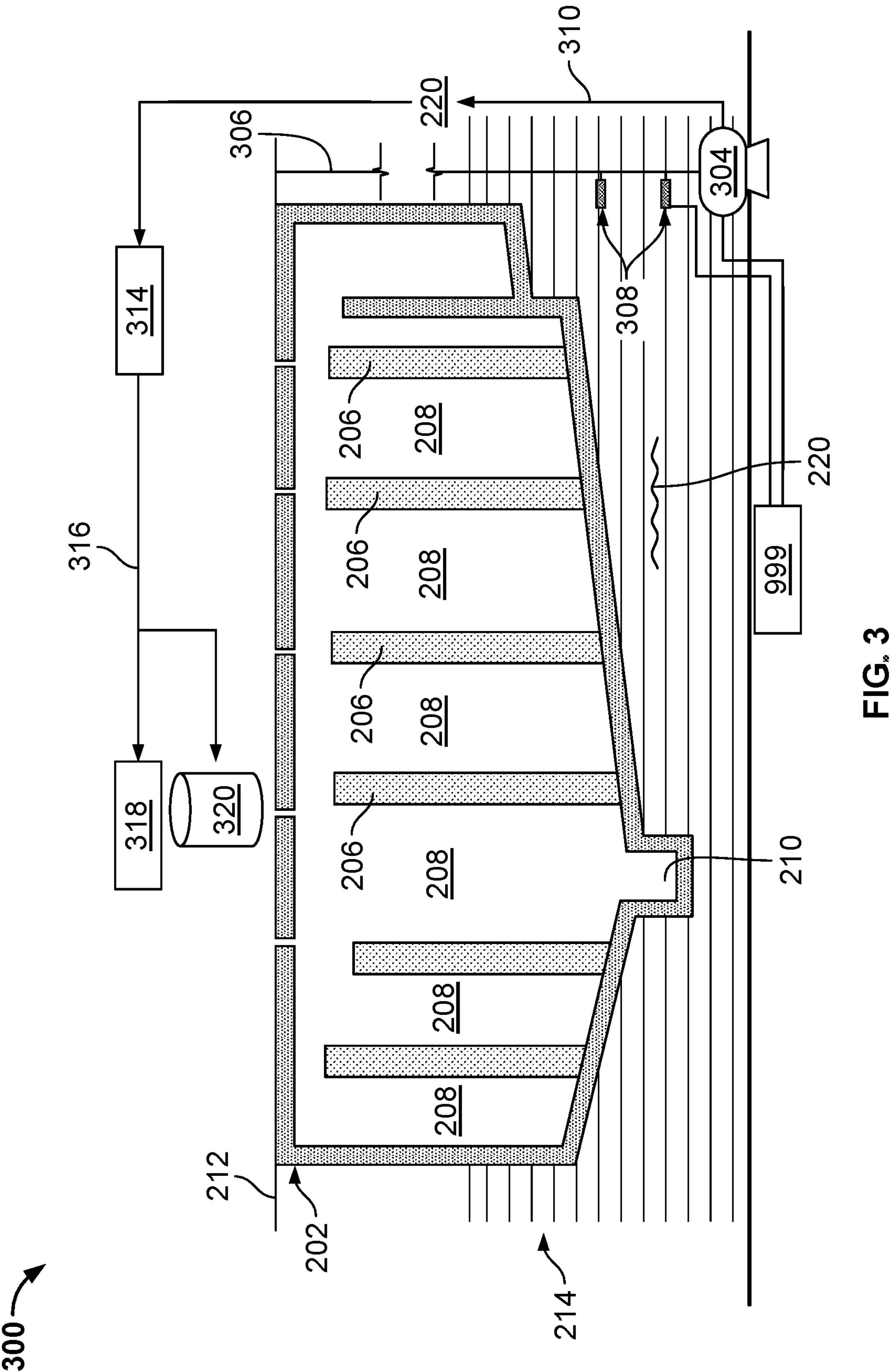
FIG. 3 illustrates an example implementation of a dewatering system for an SRU according to the present disclosure.

FIG. 3 illustrates an example implementation of a dewatering system 300 for an SRU according to the present disclosure. As previously discussed, the amount of ground water (or water 220) in a subterranean formation 214 adjacent sulfur pit 200 can cause problems with the pit 200 and other sulfur equipment. In some aspects, an operational sustainability of the sulfur pit 200 (and therefore an SRU that includes the pit 200) can rely on avoiding an ingress of the water 220 into the sulfur pit 200 due to: generation of highly corrosive sulfuric acid due to the reaction of molten sulfur with water 220, which causes sulfuric acid corrosion to the equipment and structure of the pit 200; impact of the sulfur product specification due to increased impurities such as sulfuric acid, corrosion products, and $H_2S$; direct corrosion impact to the pumps and coils caused by the highly saline water, therefore impacting the reliability and integrity of these critical equipment; and risk caused by "perched water table" and "capillary action," which allows the water 220 to accumulate around the buried structure of the sulfur pit 200, which impacts the structural integrity of the pit 200.

This example implementation of dewatering system 300 includes one or more submersible (or subterranean) pumps 304 that are positioned in subterranean formation 214. For example, the submersible pump 304 can be an electrical submersible pump (ESP) positioned in a borehole 306 that extends from the terranean surface 212 into the subterranean formation 214. The borehole 306 can be an open hole completion; in other words, the borehole 306 can be uncased and therefore allow the water 220 to flow into the borehole 306 and to the pump 304.

In this example, one or more conduits 310 is fluidly coupled to the pump 304 and extend near or to (and in some aspects, above) the terranean surface 212. In some aspects, the conduit(s) 310 can be separate from the borehole 306 (in the case that there is no borehole 306 and the pump 304 is positioned in the subterranean formation 214). In some aspects, the conduit(s) 310 can be separately installed within the borehole 306 (such as a water production tubing). In some aspects, the borehole 306 can act as the conduit(s) 310.

One or more liquid (such as water) level sensors 308 are positioned in the subterranean formation 214 (such as within the borehole 306). Each of the sensor(s) 308 are operable to measure a depth or level of water 220 within the formation 214 (such as within the borehole 306).

As shown, a controller or control system (such as a distributed control system) 999 is communicably coupled to the one or more pumps 304 (for example, to the motors of the pumps 304) and to the one or more water level sensors 308. Generally, the control system 999 is located at the terranean surface 212 and can be, for example, a microprocessor-based control system, a mechanical or electro-mechanical control system, a pneumatic control system, a hydraulic control system, or combination thereof. The control system 999 can also include components such as valves, fittings, other sensors, filters, and/or other components not shown here. In some aspects, the control system 999 can be implemented as a motor controller on a motor that drives the submersible pump 304 that is in direct communication with the one or more sensors 308.

Optionally, dewatering system 300 can include a water filtration unit 314 that is fluidly coupled to the conduit 310 to receive a supply of water 220 circulated from the subterranean formation 214, through the conduit 310 by the pump 304, and to the terranean surface 212. In some aspects, the water filtration unit 314 is a reverse osmosis (RO) filtration unit. In some aspects, the RO filtration unit can desalinate the water 220 and provide desalinated water 316 to one or both of an irrigation network 318, an industrial process 320, or other uses. The desalinated water 316 can also be stored for later use. In the absence of, for example, the water filtration unit 314, the water 220 that is circulated to the terranean surface 212 can be stored, disposed of, used, or a combination thereof. Regardless, chemical injections such as corrosion inhibitors, scale inhibitors and biocides can be added to either stream of desalinated water 316 or water 220 that originates in the subterranean formation 214.

In an example operation of the dewatering system 300, the one or more water level sensors 308 can monitor, sense, or measure (periodically or on command from the control system 999) a level of the water 220 in the subterranean formation 214, such as within the borehole 306. If the measured or sensed water level exceeds a threshold level, such as a highest tide water level, a lowest tide water level, or another water level, the water level sensor(s) 308 can signal that the threshold level has been exceeded to the control system 999 (or directly to the pump motor controller). Once signaled, the control system 999 can activate the submersible pump 304 to circulate water 220 from the subterranean formation 214 (such as from the borehole 306) into the conduit 310. The circulated water 220 can be transported to the terranean surface 212 in the conduit 310 and, for example, filtered and/or desalinated (optionally) by the water filtration unit 314.

As water 220 is circulated from the subterranean formation 214 by operation of the submersible pump 304, the one or more water level sensors 308 can continue to monitor, sense, or measure (periodically or on command from the control system 999) the level of the water 220 in the subterranean formation 214. If the measured or sensed water level drops below the threshold level, the water level sensor(s) 308 can signal that the threshold level is not exceeded to the control system 999 (or directly to the pump motor controller). Once signaled, the control system 999 can deactivate the submersible pump 304 to stop the circulation of water 220 from the subterranean formation 214 to the terranean surface 212.

Figure 4:
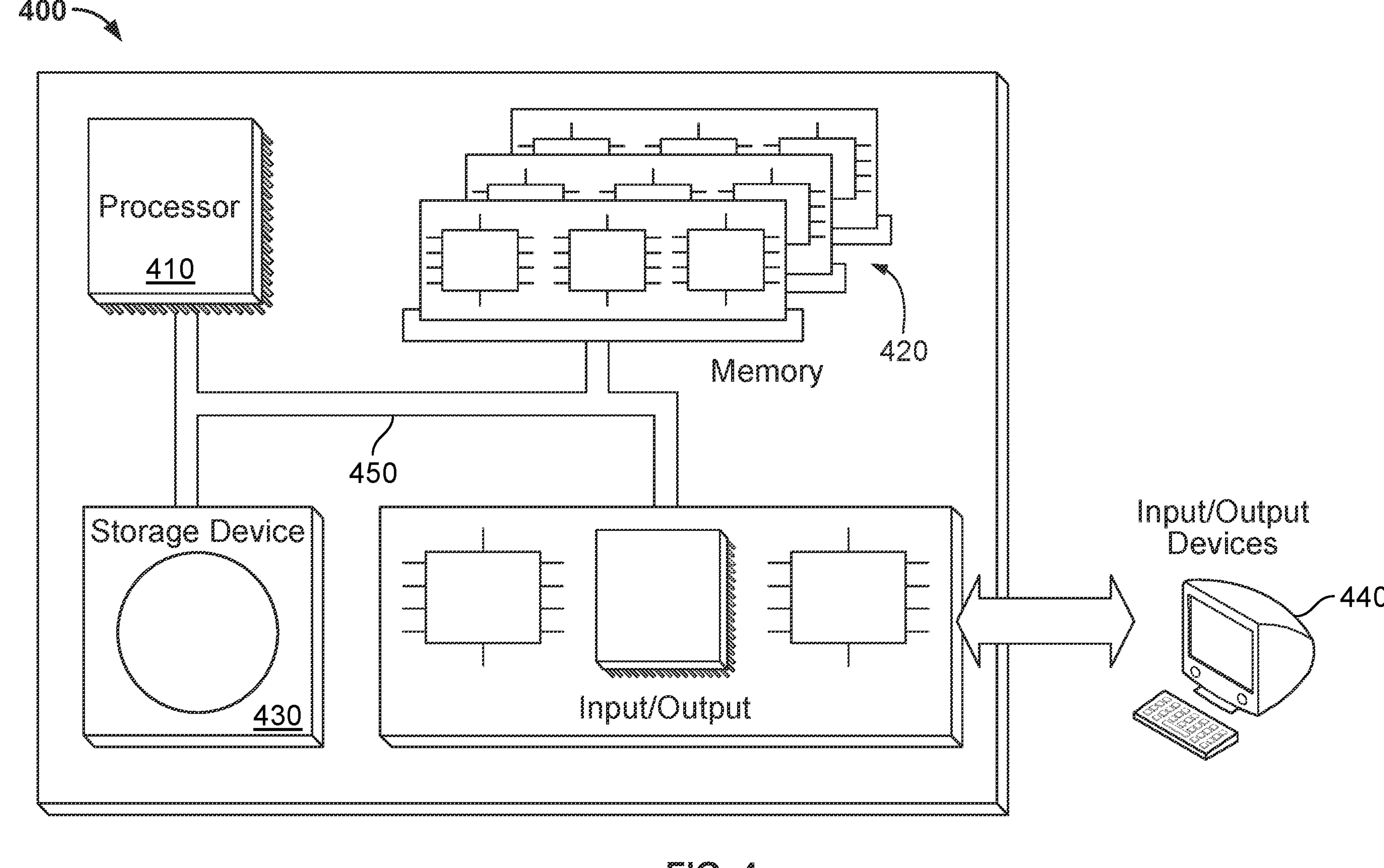
FIG. 4 is a schematic illustration of an example controller (or control system) for controlling operations of a dewatering system according to the present disclosure.

FIG. 4 is a schematic illustration of an example controller 400 (or control system) for controlling operations of a dewatering system according to the present disclosure. For example, the controller 400 may include or be part of the control system 999 shown in FIG. 3. The controller 400 is intended to include various forms of digital computers, such as printed circuit boards (PCB), processors, digital circuitry, or otherwise parts of a biocide testing system. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 400 includes a processor 410, a memory 420, a storage device 430, and an input/output device 440. Each of the components 410, 420, 430, and 440 are interconnected using a system bus 450. The processor 410 is capable of processing instructions for execution within the controller 400. The processor may be designed using any of a number of architectures. For example, the processor 410 may be a CISC (Complex Instruction Set Computers) processor, a RISC (Reduced Instruction Set Computer) processor, or a MISC (Minimal Instruction Set Computer) processor.

In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the controller 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the controller 400. In one implementation, the storage device 430 is a computer-readable medium. In various different implementations, the storage device 430 may be a floppy disk device, a hard disk device, an optical disk device, or a tape device.

The input/output device 440 provides input/output operations for the controller 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A sulfur recovery unit dewatering system, comprising:

a sulfur recovery unit configured to extract sulfur from a sour gas produced from a hydrocarbon fluid;

at least one sulfur tank installed at least partially in a subterranean formation, the at least one sulfur tank comprising a top surface at or near a terranean surface, a volume that extends below the terranean surface into the subterranean formation, and a sump that is below a water table level in the subterranean formation at a low tide level, the at least one sulfur tank configured to store the extracted sulfur;

at least one submersible pump positioned in the subterranean formation and in fluid communication with a liquid in the subterranean formation adjacent the at least one sulfur tank;

at least one conduit fluidly coupled to the at least one submersible pump and extending to the terranean surface; and at least one liquid level sensor positioned in a borehole formed into the subterranean formation adjacent to and separate from the at least one sulfur tank to measure a level of the liquid in the subterranean formation adjacent the at least one sulfur tank and configured, when the measured level exceeds a threshold level, to signal the at least one submersible pump to circulate at least a portion of the liquid from the subterranean formation, into the at least one conduit, and toward the terranean surface.

2. The sulfur recovery unit dewatering system of claim 1, wherein the liquid comprises freshwater or brine.

3. The sulfur recovery unit dewatering system of claim 1, further comprising a liquid filtration unit fluidly coupled to the at least one conduit and configured to receive the circulated portion of the liquid from the subterranean formation.

4. The sulfur recovery unit dewatering system of claim 3, wherein the liquid filtration unit comprises a reverse osmosis filtration unit.

5. The sulfur recovery unit dewatering system of claim 1, wherein the threshold level is the low tide level.

6. The sulfur recovery unit dewatering system of claim 1, further comprising a controller communicably coupled to the at least one submersible pump and the at least one liquid level sensor, the controller configured to perform operations comprising:

identifying the measured level at the at least one liquid level sensor; and activating the at least one submersible pump based on the measured level exceeding the threshold level.

7. The sulfur recovery unit dewatering system of claim 1, wherein the at least one submersible pump is positioned in the borehole formed from the terranean surface to the subterranean formation.

8. A method for dewatering a subterranean formation adjacent a sulfur recovery unit, comprising:

providing at least one submersible pump positioned in a subterranean formation adjacent at least one sulfur tank installed at least partially in the subterranean formation, the at least one sulfur tank comprising a top surface at or near a terranean surface, a volume that extends below the terranean surface into the subterranean formation, and a sump that is below a water table level in the subterranean formation at a low tide level, the at least one sulfur tank configured to store sulfur extracted, in a sulfur recovery unit, from a sour gas produced from a hydrocarbon fluid;

sensing, with at least one liquid level sensor positioned in a borehole formed into the subterranean formation adjacent to and separate from the at least one sulfur tank, a level of a liquid in the subterranean formation adjacent the at least one sulfur tank;

determining that the sensed level of the liquid exceeds a threshold level; and based on the determination, operating the at least one submersible pump to circulate at least a portion of the liquid from the subterranean formation, into at least one conduit fluidly coupled to the at least one submersible pump, and to the terranean surface through the at least one conduit.

9. The method of claim 8, wherein the liquid comprises freshwater or brine.

10. The method of claim 8, further comprising circulating the portion of the liquid to a liquid filtration unit fluidly coupled to the at least one conduit.

11. The method of claim 10, wherein the liquid filtration unit comprises a reverse osmosis filtration unit.

12. The method of claim 10, further comprising cleaning the portion of the liquid in the liquid filtration unit.

13. The method of claim 8, wherein the threshold level is the low tide level.

14. The method of claim 8, further comprising:

sensing, with at least one liquid level sensor, another level of the liquid in the subterranean formation adjacent the at least one sulfur tank;

determining that the another sensed level of the liquid is less than the threshold level; and based on the determination, stopping operation of the at least one submersible pump.

15. A dewatering system, comprising:

a subterranean pump positionable in a borehole formed from the terranean surface adjacent a sulfur pit and into a subterranean formation that comprises water, the sulfur pit comprising an opening at the terranean surface and a volume that extends below the terranean surface into the subterranean formation with a low level that is below a water table level in the subterranean formation at a low tide level;

at least one conduit fluidly coupled to the subterranean pump and configured to extend from the pump to a terranean surface;

a water level sensor positionable in the borehole to measure a level of the water in the subterranean formation adjacent the sulfur pit; and a control system communicably coupled to the subterranean pump and the water level sensor and configured to perform operations comprising:

identifying a water level sensed by the water level sensor, determining that the water level exceeds a threshold level, and based on the determination, activating the subterranean pump to remove water from the subterranean formation into the at least one conduit.

16. The dewatering system of claim 15, wherein the water is brine.

17. The dewatering system of claim 15, wherein the at least one conduit is configured to fluidly couple to a water filter assembly on the terranean surface.

18. The dewatering system of claim 17, wherein the water filter assembly is a reverse osmosis filter assembly.

19. The dewatering system of claim 15, wherein the threshold level is at a predetermined depth below the terranean surface.

20. The dewatering system of claim 15, wherein the control system is configured to perform operations comprising:

periodically identifying the water level sensed by the water level sensor, and when the water level does not exceed the threshold level, deactivating the subterranean pump.

* * * * *